United States Patent [19]

Berruti et al.

[11] Patent Number: 4,630,077

[45] Date of Patent: Dec. 16, 1986

[54] SERIAL PRINTHEAD INK SUPPLY

[75] Inventors: Pierangelo Berruti, Chivasso; Roberto Guelfo, Montanaro; Alessandro Crotti, Strambino; Ennio A. Pozzo, Borgofranco; Roberto Realis Luc, Ivrea, all of Italy

[73] Assignee: Ing. C. Olivetti & C., S.p.A., Ivrea, Italy

[21] Appl. No.: 686,484

[22] Filed: Dec. 26, 1984

[30] Foreign Application Priority Data

Dec. 27, 1983 [IT] Italy .............................. 68355 A/83

[51] Int. Cl.[4] .............................................. G01D 15/16

[52] U.S. Cl. ................................ 346/140 R; 400/126

[58] Field of Search .............. 346/75, 140 R; 400/126

[56] References Cited

U.S. PATENT DOCUMENTS 4,131,899 12/1978 Christou .......................... 346/140 R 4,162,501 7/1979 Mitchell et al. ................ 346/140 R 4,380,019 4/1983 Steinberger et al. ........... 346/140 R 4,503,442 3/1985 Barbero et al. ................. 346/140 R 4,503,443 3/1985 Dagna et al. ................... 346/140 R

*Primary Examiner*—E. A. Goldberg

*Assistant Examiner*—Gerald E. Preston

*Attorney, Agent, or Firm*—Banner, Birch, McKie & Beckett

[57] ABSTRACT

The head (12) comprises a closed container (14) carrying two electrodes (36, 62) and a nozzle (18) and mounted removably on a carriage (13).

In order for the ink (16) always to be held at atmospheric pressure, the container (14) comprises an expansible space defined by a diaphragm (67) having a portion (74) aligned with an opening (73) in the container (14).

The diaphragm (67) is of butyl rubber which can be pierced with a syringe to permit the container (14) to be refilled with ink (18).

The container (14) is closed by an alumina plate (32) carrying the nozzle (18) and joined to a second plate (76) parallel thereto, and of a material which can be wetted by the ink (16). The second plate (76) constitutes a wall for resisting the pressure waves of an ink jet leaving the nozzle (18), and is immediately covered by the ink again.

8 Claims, 7 Drawing Figures

SERIAL PRINTHEAD INK SUPPLY

BACKGROUND OF THE INVENTION

The present invention relates to an ink-jet printing head for electrically conductive ink, comprising an electrically insulating container for the ink, closed by a flexible diaphragm, the container having a nozzle for the selective emission of droplets of ink, an electrode in contact with the ink and a counter-electrode which is adjacent to the nozzle, emission of droplets of ink being caused by an electrical voltage pulse between the counter-electrode and the electrode.

In known printers of the above-indicated type, vapours or bubbles are formed in the ink during the during the printing operation. These accumulate in the container and have to be removed from the nozzle in order to prevent the emission of droplets therefrom from being blocked.

In order to remedy this disadvantage, a printing head has already been proposed wherein the container is closed by a flexible diaphragm which is spring-loaded so as to create a certain depression in the container and thus to cause bubbles to collect in the space formed between the ink and the diaphragm, as the ink is consumed. Because of the above-mentioned spring however, the head is complicated and requires a certain space to permit expansion of the cartridge.

A printing head has also been proposed wherein the container is provided with a hole to permit atmospheric pressure to be maintained on the ink. That head suffers from the disadvantage that ink is lost from the head in the event of the head being inverted or if it is transported, for example by air.

SUMMARY OF THE INVENTION

A printing head according to the present invention is characterised in that the diaphragm has an edge which is gripped between the edge of the body of the container and the edge of a cover provided with an opening to permit the diaphragm to maintain the ink at atmospheric pressure.

The ink is maintained at atmospheric pressure, while the container communicates with the exterior only by way of the nozzle.

BRIEF DESCRIPTION OF THE DRAWINGS

The invention will be described in more detail, by way of example and with reference to the accompanying drawings, in which.

DESCRIPTION OF THE PREFERRED EMBODIMENTS

Figure 1:
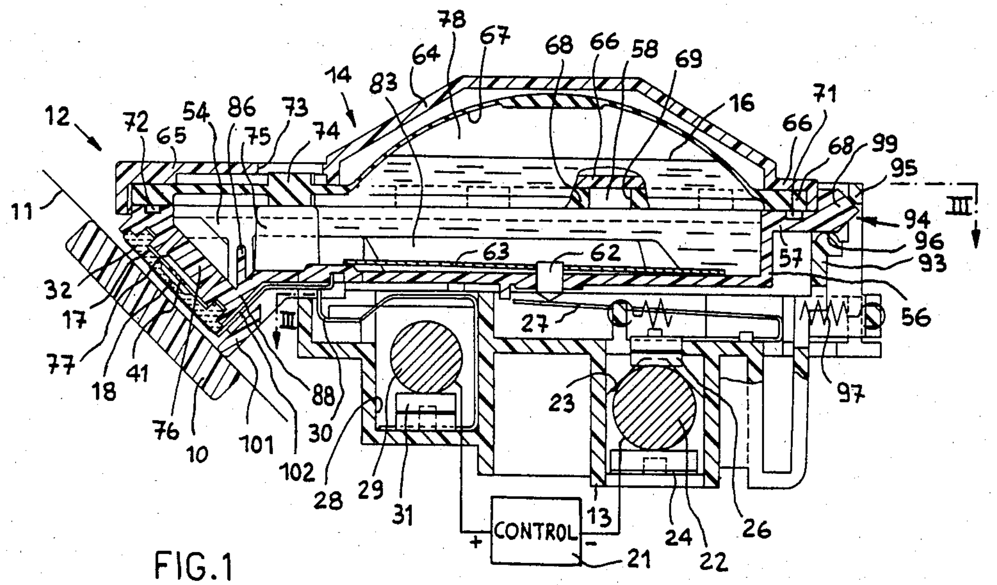
FIG. 1 is a view in longitudinal section of a printer incorporating a printing head according to the invention.

Referring to FIG. 1, reference numeral 10 generally denotes a support bar for a sheet of paper 11 which is displaced vertically to permit dots to be printed in successive elementary rows, for example for dot matrix alphabet printing.

The printer comprises an ink jet printing head generally denoted by reference numeral 12, which is mounted on a carriage 13 which is movable transversely with an alternating movement in known manner. The head 12 essentially comprises a container 14 of insulating material for the ink 16 wich is electrically conductive. The container 14 is closed towards the support 10 by a structure 17 in which there is disposed a nozzle 18 for the expulsion of particles of ink 16. the latter is in electrical contact with an electrode, as will be seen in greater detail hereinafter, which is connected to the outside of the container 14.

The printer comprises an electrical control circuit which is generally indicated at 21 and which is capable of producing an electrical voltage pulse between a counter-electrode adjacent to the nozzle 18, and the electrode. A state of electrical and thermal excitation is then created at the meniscus formed by the ink 16 in the nozzle 18, such as to cause a droplet of ink to be discharged through the nozzle 18, substantially in the manner described in the present applicants' European patent application no. 84303336.6.

Figure 4:
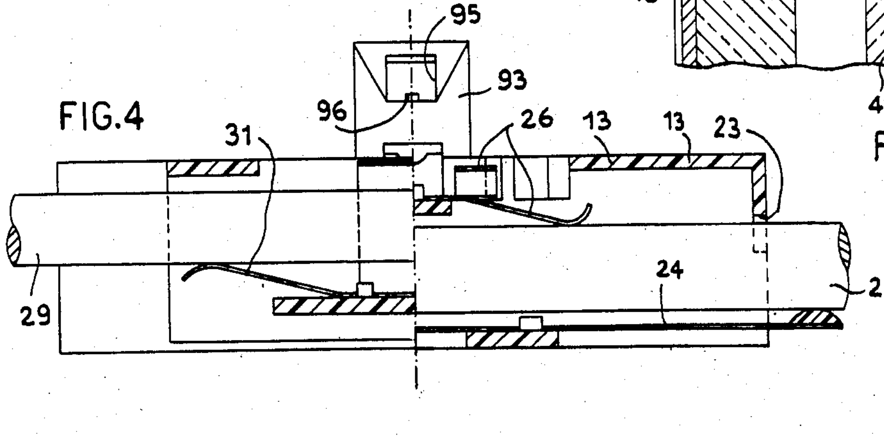
FIG. 4 is a view in section taken along line IV—IV in FIG. 3.

In particular, the carriage 13 is guided transversely by a cylindrical bar 22 against which a V-shaped seat 23 of the carriage is caused to bear by means of a leaf spring 24, for taking up clearance (see also FIG. 4). The carriage 13 also carries an electrical contact 26 which slides along the bar 22 which is electrically connected to the negative terminal of the control circuit (see FIG. 1). The contact 26 comprises a projection 27 which is electrically connected to the above-mentioned electrode which is in contact with the ink 16.

Figure 3:
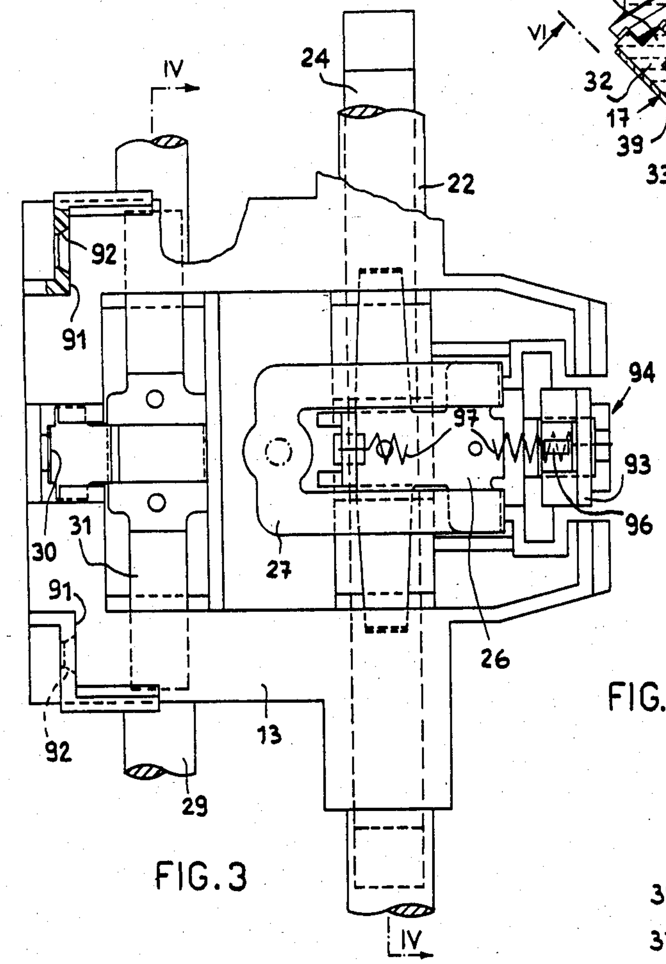
FIG. 3 is a view of part of the printing head in section taken along III—III in FIG. 1.

The carriage 13 also bears by way of a seat member 28 on a second transverse bar 29 which has a wide clearance in the seat member 28. The carriage 13 carries a second electrical contact 31 (see FIGS. 3 and 4) which slides along the bar 29 which is electrically connected to the positive terminal of the control ciruict 21 (see FIG. 1). The contact 31 is provided with a projection 30 electrically connected to the above-mentioned counter-electrode, as will be described hereinafter. The sliding contact 31 (see FIG. 4) comprises a leaf or blade spring which tends to urge the carriage 13 in the anti-clockwise direction in FIG. 1.

Figure 5:
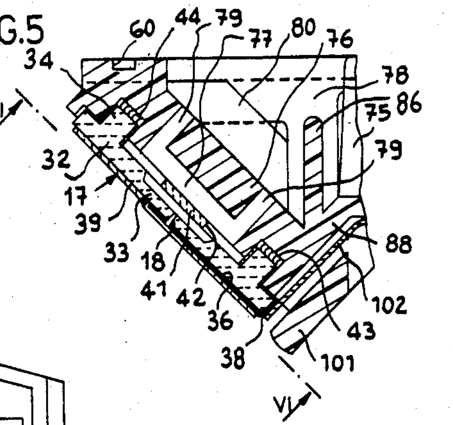
FIG. 5 is a view of part of the printing head in section taken along line V—V in FIG. 2 on an enlarged scale.
Figure 6:
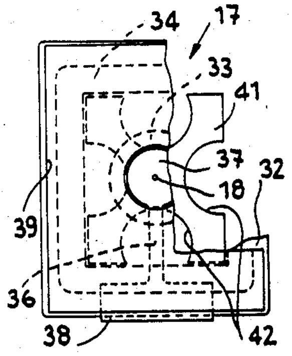
FIG. 6 is a view of part of the printing head in section taken along line IV—IV in FIG. 5.

The structure 17 comprises a first plate 32 (see FIG. 5) of alumina which is a material that can be easily wetted by the ink 16. The plate 32 is about 0.6 mm in thickness and, in the central part thereof, has a circular portion 33 whose thickness is reduced to about half, for example 0.35 mm. The plate 32 also has a substantially rectangular rib 34 for fixing it to the container 14. Provided on the outside surface of the plate 32 is a layer 36 (see FIG. 6) of conductive material, which is between 40 and 50 um in thickness).

Figure 7:
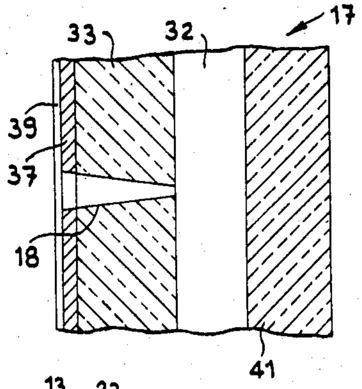
FIG. 7 is a detail from FIG. 5 on a greatly enlarged scale.

The layer 36 comprises a circular portion 37 which is concentric with respect to the nozzle 18 and which is of the order of 2 mm in diameter, and a portion 38 which extends over the lower edge of the plate 32, for a considerable part of the width of the plate. The outside surface of the plate 32, including the surface of the layer 36 except for the portion 37 and the part of the lower edge of the plate 32, is finally covered with an anti-adhesion layer 39 (see FIG. 7), for example glass, which is between 15 and 20 um in thickness.

The plate 32 when covered in that manner is pierced by a laser beam so as to produce a minimum width for the nozzle 18 of between 25 and 30 um, preferably 30 um, at the inside surface of the plate 32, and a maximum width of between 100 and 130 um, preferably 120 um, at the outside surface of the plate 32 and thus the layer 37. As is more clearly described in above-mentioned European patent application No. 84303336.6, each pulse from the control circuit 21 (see FIG. 1) produces, in the smaller section of the nozzle 18 (see FIG. 7), varporisation of a portion of the ink which expels the thickness of ink in the remaining part of the nozzle 18. That thickness of ink will print a dot which is 0.2–0.3 um in diameter, as required in high-speed low-definition printers. The discharge of ink from the nozzle 18 is followed by the outward discharge of a substantial part of the vapour formed. The problem of bubbles of vapour being formed and directed inwardly in consequence of the ink jet pressure wave is minimised.

The structure 17 further comprises a second plate 41 of material which can be easily wetted by the ink 16, also being for example alumina. The plate 41 which is substantially equal in thickness to the portion 33 is of a rectangular shape which can be fitted within the rib 34, but has four cut-out portions 42 at its edges, which define passages for the ink.

The structure 17 with the plate 41 fitted within the rib 34 on the plate 32 is finally stuck in a seat portion 43 of the container 14, for example by means of a layer 44 of epoxy resin.

The central solid portion of the plate 41 therefore forms a resistance surface against which the pressure wave strikes, further reducing any bubbles which are directed inwardly of the arrangement. In addition, since the plate 41 is of a wettable material, in the event that, following the ink jet, a bubble temporarily removes the ink from a region of that portion, it is immediately covered by ink again.

The container 14 (see FIG. 2) comprises a rear portion 52 of substantially circular shape and a front wedge-shaped portion 53 which tapers inwardly towards a terminal portion 54 (see FIG. 1) which is inclined downwardly at 45° and on to which the structure 17 is fixed. The shape of the tapering portion 53 is such as to permit the printed line to be seen, with the exception of a small number of characters which are in line with the terminal portion 54.

The container 14 comprises a body rigid or lower shell 56 of plastics material, for example ABs. The body 56 is defined by a substantially planar upper edge 57 on which there is disposed a series of substantially cylindrical projections 58 (see FIG. 2), of elongate section. Also provided on the edge 57 are two reference recesses 59 and 60.

Figure 2:
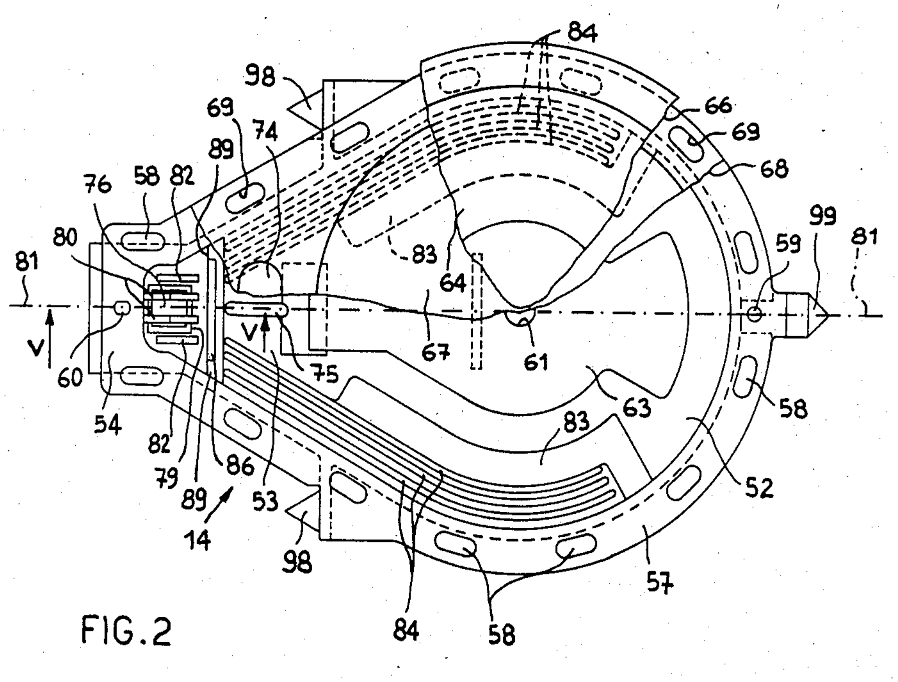
FIG. 2 is a partly sectional plan view of the head shown in FIG. 1.

Disposed in the central part of the lower shell or body 56 (see FIG. 1) is a hole 61 into which a metal pin 62 is fitted and sealed, the metal pin 62 being clinched or riveted to a plate 63 which is also made of metal (see FIG. 2). The plate 63 has two wings which extend over a susbtantial part of the bottom of the body of shell 56. The plate 63 forms the electrode of the print head 12, which is in electrical contact with the ink 16.

The container 14 further comprises a cover or upper shell 64 of the same material as the lower shell or rigid body 56, being provided with a flat portion 65 over the wedge-shaped portion 53 (FIG. 2) of the container 14. The shell 64 is provided with a substantially planar lower edge 66 (FIG. 1) which is of the same form as the edge 57 of the shell 56.

A dome-shaped diaphragm 67 made of elastic material, for example butyl rubber, is disposed between the two shells 56 and 64. The diaphragm 67 is provided with an edge 68 which is greater in thickness than the remainder of the diaphragm 67 and which is arranged to mate with the two edges 57 and 66. The edge 68 of the diaphragm is provided with a series of slots 69 (see also FIG. 2) into which engage the projections 58 on the edge 57, and two reference projections 71 and 72 which engage into the recesses 59 and 60 in the edge 57.

The upper shell 64 is provided with an oblong opening 73 in which can be received a locally thickened portion 74 of the diaphragm 67. Part of the thickness of the portion 75 projects downwardly and normally bears against a projection 75 on the bottom of the lower shell 56, ensuring that under all circumstances the diaphragm 67 does not stick to the bottom of the shell 56, by virtue of a reduction in pressure in the space between the diaphragm 67 and the shell 56.

The container 14 is assembled by fitting the diaphragm 67 on to the lower shell 56 after the projections 71 and 72 have been inserted into the recesses 59 and 60, in such a way as to engage the projections 58 into the slots 69.

The upper shell 64 is then positioned in such a way that the edge 66 mates with the edge 68 and the edge 66 is secured to the projections 58 by pressure and ultrasonic welding. The space between the lower shell 56 and the diaphragm 67 is thus hermetically sealed. That space is filled with the ink 16 after the welding operation, using a syringe through the opening 73. In particular, the portion 74 which bears against the projection 75 is perforated by means of the syringe needle. Air is first extracted from the container 14 and then the required amount of ink is injected, generally being of the order of 3–4 $cm^3$ which is sufficient for printing over half a million characters. The syringe is connected by way of a three-way switchable valve in order to switch it from being connected to an air suction pump to being connected to a pump for injecting the ink.

The butyl rubber of the diaphragm 67 has elastic characteristics such that, when the needle of the syringe is withdawn, the hole which is produced thereby in the portion 74 automatically closes off whereby the container 14 can be refilled a number of times. By virtue of the opening 73, the diaphragm 67 always maintains the ink 16 under atmospheric pressure, thus ensuring that any bubbles which are formed within the container 14 by the printing process do not block the nozzle 18 of the structure 17.

The portion 54 of the container 14 comprises a wall 67 (see FIG. 5) which is parallel to the structure 17, for defining in the shell 56 at first space 77 which is disposed between the structure 17 and the wall 76 and a second space 78 which is disposed between the wall 76, the diaphragm 67 and the shell 56. The thickness of the space 77 is of the same order of magnitude as the total thickness of the structure 17 and is in communication with the space 78 by way of a section 79 of the wall 76.

The wall is held in a position of being secured to the shell 56 by way of two plates 80 (see FIG. 2) parallel to the central plane 81 of the container 14, which passes through the axis of the nozzle 18, and laterally equally spaced therefrom. Two other plates 82, at the two sides of the wall 76, together with the plates 80, form a series of passages for the ink 16, such passages being symmetrical with respect to the plane 81. Two chutes or slipway portions 83 (see FIG. 1 and 2) are formed in the floor of the space 78 and are symmetrical with respect to the plane 81 and of a shape that follows the adjacent portion of the edge 57 of the shell 56. Disposed between each chute 83 and the edge 57 are three ribs 84 which are similar in shape to the chute 83 but which extend towards the portion 54 and which form in the shell 56 a series of channels or grooves which are symmetrical with respect to the plane 81. Finally, the shell 56 comprises a transverse plate 86 which rises from an inclined portion 88 of the bottom of the shell 56 and which extends laterally so as to leave two passages 89 for the ink at the sides.

The assembly of the chutes 83, the ribs 84 and the plates 80, 82 and 86 services to promote transportation of the ink 16 towards the space 77 until the ink has been totally used up. In particular, the print head moves transversely with an alternating movement in use, and when the level of the ink 16 drops below the level of the ribs 84 and the chutes 83, at each reversal in the movement of the carriage the ink 16 is displaced outwardly by inertia, passing over the chute 83 into the passages defined between the ribs 84, where it remains. It is then conveyed into the depression formed by the inclined portion 88 and from there passes through the passages 89 between the plates 80 and 82 into the section 79 and the space 77, whereby the nozzle 18 is supplies with ink down to the last drop.

The container 14 is mounted removably on the carriage 13. For that purpose, at its rear the carriage 13 is provided with two substantially symmetrical shoulders 91 (see FIG. 3) in which two tapered seat members 92 are disposed for positioning purposes. At the front, the carrige 13 is provided with a relatively elastic central projection 93 in which there is disposed a further positioning seat member 94 formed by a rectangular member 95 (see FIG. 1) and a rounded edge portion 96. A coil spring 97 pulls the projection 93 rearwardly. The shell 56 (see FIG. 2) is in turn provided with two tapering rear projections 98 which are arranged to engage the seat members 92 and a central tapering front projection 99 (see FIG. 1) for engaging the seat 94. The shell 56 is also provided with a rearward projection 101 (FIG. 1) disposed at a predetermined spacing from the structure 17 and arranged to bear, due to the resilient force of the sliding leaf spring contact 31 against the paper 11, so as to hold the nozzle 18 at a strictly constant distance from the paper. Finally, fitted beneath the shell 56 is a resilient electrical contact 102 (see FIG. 5) which on the one hand bears against the portion 38 of the counter-electrode 36 and on the other hand against the projection 30 (see FIG. 1) of the sliding contact 31.

The head 12 is therefore fitted to and removed from the carriage 14 with the greatest of ease, by overcoming the force of the spring 97.

It will be appreciated that the above-described printing head may be the subject of various modifications and improvements without departing from the scope of the invention. For example, the two plates 32 and 41 of the structure 17 may be stuck together before being fixed to the container 14. Furthermore, the carriage 13 may be provided, in line with the seat 23, with felt buffers which are impregnated with lubricating oil to facilitate the sliding motion of the carriage 13 on the bar 22.

We claim:

1. An ink jet printing head comprising a container formed of electrically insulating material for an electrically conductive ink, an electrode in contact with said ink, a capilary nozzle provided on said container for the selective emission of ink droplets, and a counterelectrode provided on a portion of the outer surface of said container adjacent said nozzle, the emission of droplets of ink being caused by an electrical voltage pulse between said electrode and said counterelectrode so as to cause vaporization of a portion of ink in a section of the nozzle, wherein said container includes:

- a rigid shell carrying said nozzle,
- a flexible diaphragm tightly connected to said shell to provide a closed chamber for said ink, a rigid cover tightly conenected to said shell and said diaphragm so as to form with said shell a rigid external casing and to form with said diaphragm a space separate from said chamber and free of ink, and
- an opening on said cover to permit said diaphragm to maintain said chamber during the printing process constantly under atmospheric pressure,
- the edge of the diaphragm being of increased thickness and being provided with a plurality of openings capable of engaging a corresponding plurality of projections on the edge of the shell of the container, said projections being welded to the edge of the cover by pressure and ultrasonic welding.

2. a head according to claim 1, characterised in that the diaphragm (67) further comprises a pair of cylindrical projections (71, 72) which are arranged to engage into two complementary recesses (59, 50) at the edge of the body (56) of the container (14) to facilitate orientation of the diaphragm (62) on the container (14).

3. An ink jet printing head comprising a container formed of electrically insulating material for an electrically conductive ink, an electrode in contact with said ink, a capillary nozzle provided on said container for the selective emission of ink droplets, and a counterelectrode provided on a portion of the outer surface of said container adjacent said nozzle, the emission of droplets of ink being caused by an electrical voltage pulse between said electrode and said counterelectrode so as to cause vaporization of a portion of ink in a section of the nozzle, said container including a rigid shell carrying said nozzle, a flexible diaphragm tightly connected to said shell to provide a closed chamber for said ink, a rigid cover tightly connected to said shell and said diaphragm so as to form with said shell a rigid external casing and to form with said diaphragm a space separate from said chamber and free of ink, and

- an opening on said cover to permit said diaphragm to maintain said chamber during the printing process constantly under atmospheric pressure, characterised in that the container (14) is closed by an insulating plate (32) carrying the nozzle (18) there being a first space (72) between the plate and a wall (76) of the container (14) parallel to the plate (32) and a second space (78) whose volume can be varied by movement of the diaphragm (62), the spaces (77, 78) being connected by a least one duct (79), and in that the second space (78) is provided with a series of grooves which are symmetrical with respect to the central plane of the container (14) which passes through the nozzle (18) for the purposes of directing the ink (16) towards the first space (77).

4. a head according to claim 3 characterised in that the insulating plate (32) is connected to a second plate (41) which is parallel thereto and which is spaced from the insulation plate (32) by a distance susbtantially equal to the length of the nozzle (18), the second plate (76) being of a material which is wettable by the ink (16) and having a central solid region (41) and lateral openings (42) so as to form a wall for resisting a pressure wave caused by formation of an ink jet.

5. A head according to claim 3, mounted removably on a carriage (13) movable transversely with respect to a sheet (11) of paper, wherein the container (14) comprises three pointed projections (98, 99) which are arranged to be engaged into corresponding spaces (92, 94) int he carriage (13), one of the spaces (94) being disposed on the central plane and being partially bounded by a resilient projection (93) arranged so that the corresponding projection (99) on the container (14) is received with a snap fit in the space (94) and the container (14) is urged towards the paper (11), the container (14) comprising a sliding member (101) arrangd to bear against the paper (11), and holding the nozzle (18) at a predetermined spacing therefrom.

6. A head according to claim 5, characterised by an insert (63) disposed on the bottom of the body (56) of the container (14) and extending over a portion of the bottom, the insert (63) having a metal surface layer forming the electrode, the metal layer being in electrical contact with an electrical contact (22) carried by the carriage.

7. An ink jet printing head comprising a container formed of electrically insulating material for an electrically conductive ink, an electrode in contact with said ink, a capillary nozzle provided on said container for the selective emission of ink droplets, and a counterelectrode provided on a portion of the outer surface of said container adjacent said nozzle, the emission of droplets of ink being caused by an electrical voltage pulse between said electrode and said counterelectrode so as to cause vaporization of a portion of ink in a section of the nozzle, said container including a rigid shell carrying said nozzle, a flexible diaphragm tightly connected to said shell to provide a closed chamber for said ink, a rigid cover tightly connected to said shell and said diaphragm as to form with said shell a rigid external casing and to form with said diaphragm a space separate from said chamber and free of ink, and an opening on said cover to permit said diaphragm to maintain said chamber during the printing process constantly under atmospheric pressure, said shell being provided with a substantially planar upper edge, said cover being provided with a substantially lower edge matching with said upper edge, said diaphragm being dome-shaped and intermediate between said shell and said cover and having an edge gripped between said upper edge and said lower edge, wherein said diaphragm has an increased-thickness portion located in correspondence with said opening in said cover, said portion projecting downwards to prevent the sticking of the diaphragm on said shell by virtue of a reduction of pressure in said space between said diaphragm and said shell.

8. A head according to claim 7, wherein said diaphragm is made of material comprising butyl rubber and said container is filled with ink by perforating said diaphragm through said opening, said portion having such a thickness as to automatically close the perforation after the filling operation.

* * * * *